United States Patent [19]

Hadley et al.

[11] 3,958,055

[45] May 18, 1976

[54] ADHESIVE BONDING OF ISOTROPIC FIBER WEBS TO FORM PATTERN BONDED COMPOSITES

[75] Inventors: Thomas A. Hadley, Hendersonville, N.C.; Edward H. Grupe; Jack L. Bergsbaken, both of Appleton; David P. Hultman, Neenah, all of Wis.

[73] Assignee: Kimberly-Clark Corporation, Neenah, Wis.

[22] Filed: Aug. 14, 1974

[21] Appl. No.: 497,474

[52] U.S. Cl.............................. 428/198; 156/176; 156/179; 156/291; 156/324; 428/201; 428/302; 428/332; 428/339; 428/342
[51] Int. Cl.².................. B32B 5/26; B32B 5/28; B32B 7/14; B32B 31/12
[58] Field of Search ........... 161/146, 148, 156, 152, 161/129; 156/176, 179, 291, 322; 428/198, 201, 302, 332, 339, 342

[56] References Cited
UNITED STATES PATENTS

| 3,009,822 | 11/1961 | Drelich et al. | 161/156 |
|---|---|---|---|
| 3,214,323 | 10/1965 | Russel et al. | 161/156 |
| 3,327,708 | 6/1967 | Sokolowski et al. | 161/148 |
| 3,341,394 | 9/1967 | Kinney | 161/148 |
| 3,484,330 | 12/1969 | Sokolowski et al. | 161/148 |
| 3,622,423 | 11/1971 | Hadley | 161/156 |
| 3,695,985 | 10/1972 | Brock et al. | 161/129 |
| 3,748,216 | 7/1973 | Brock | 156/291 |
| 3,788,936 | 1/1974 | Brock et al. | 156/291 |
| 3,793,133 | 2/1974 | Beaudoin et al. | 156/324 |
| 3,802,980 | 4/1974 | Harmon | 161/156 |

*Primary Examiner*—J. C. Cannon
*Attorney, Agent, or Firm*—Wolfe, Hubbard, Levdig, Voit & Osann, Ltd.

[57] ABSTRACT

Outer plies of cellulosic tissue and an intermediate, Isotropic, reinforcing textile length fiber web are attached together by a pattern of adhesive lines with the fibers of the web embedded in the adhesive lines, to provide a tissue fiber laminate nonwoven fabric which is flexible and conformable with adequate strength particularly in the cross direction so as to be suitable for use as a textile substitute. The process for manufacturing this nonwoven fabric in a single pass involves printing the adehsive on one web of cellulosic tissue in a clearly defined fine line pattern, laying the fiber web on the adhesive bearing surface of the tissue web, juxtaposing a second cellulosic tissue web on the fiber web, and hot calendering the three layer composite so as to force the adhesive through the fiber web into the second tissue web while bonding the fibers of reinforcing web in place, the amount, viscosity and line pattern of the adhesive being such as to obtain ply attachment and a soft, flexible, conformable fabric rather than a stiff, boardy, sleazy material which can result from overbonding.

8 Claims, 4 Drawing Figures

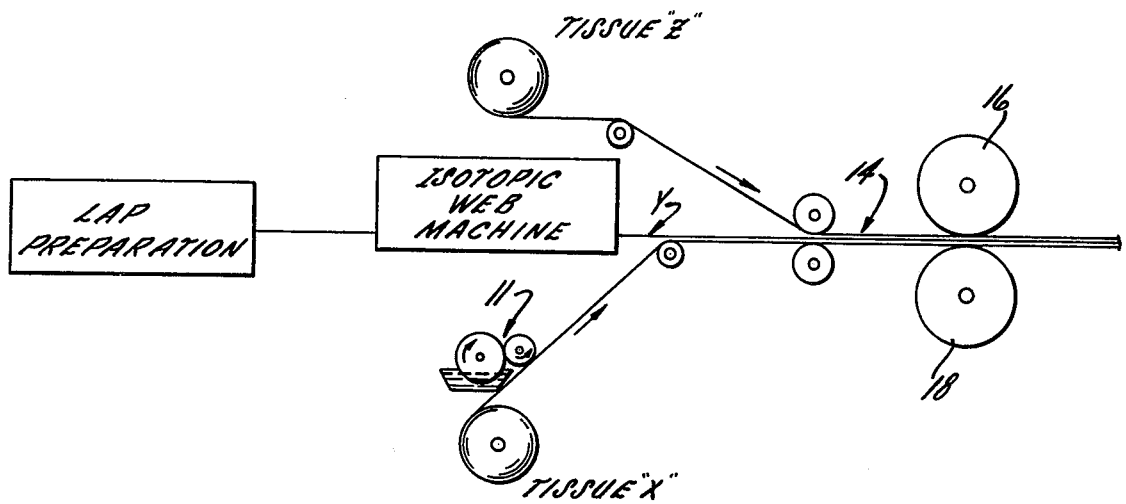
_Fig. 1_
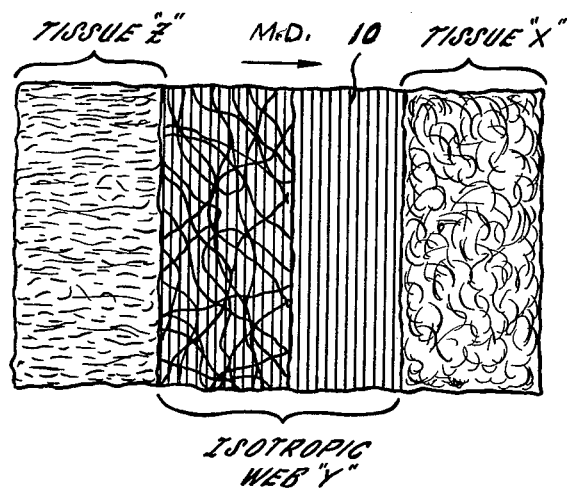
_Fig. 2_

ADHESIVE BONDING OF ISOTROPIC FIBER WEBS TO FORM PATTERN BONDED COMPOSITES

This invention relates to improvements in disposable nonwoven fabrics of the type incorporating webs of fibers for reinforcement between outer webs of creped cellulosic wadding, commonly known as creped tissue.

One such nonwoven fabric which has gone into widespread commercial use is described in U.S. Pat. No. 3,484,330 as being a low cost fabric with properties of adequate strength, good conformability, high flexibility, a cloth-like hand and appearance, softness, and being particularly suitable for uses where disposability is desired, such as for bedsheets, pillow cases, hospital products such as gowns and drapes, and the like. This nonwoven fabric is a crosslaid adhesive bonded laminate of creped tissue and aligned fiber webs.

In the manufacture of such crosslaid laminates, like components each comprising a similar combination of a layer of creped tissue, a patterned adhesive, and a layer of alined fibers are arranged in face-to-face contact with the alined fibers in one component arranged to lie in a cross direction with respect to the alined fibers of the other component. The crosslaying of such components by suitable crosslaying apparatus such as described in U.S. Pat. No. 2,841,202, results in the finished fabric having crosswise seams on one side where the adjacent edges of the crosslaid tissue webs abut or slightly overlap, while on the other side the tissue web is continuous. In such a finished fabric the machine direction of the continuous tissue web is alined with the length of the fabric, while the machine direction of the crosslaid tissue webs extends in the cross direction. The fabric is clearly and noticeably two-sided, and while that presents no great problem in most cases, there are product applications where a fabric without seams and the same on both sides would be more desirable.

Crosslaying machinery is, moreover, initially costly and requires a certain amount of maintenance all of which must be taken into account in determining the cost of manufacture of crosslaid tissue fiber laminate fabrics made with the use of such machinery.

While such crosslaid fabrics have had widespread commercial use, it has been recognized that the cost of manufacture of tissue fiber laminate fabrics would be less if the fabrics could be made in a single pass rather than by crosslaying, by introducing one fiber web between tissue webs with their machine direction the same, and adhesively bonding this three layer laminate. Indeed, proposals for such constructions long preceded the development of crosslaid tissue fiber laminates, as mentioned in patent 3,484,330.

Heretofore, such three layer laminate fabrics have had various defects, foremost of which has been lack of uniformity throughout and inadequate strength, particularly in the cross direction of such finished laminates when made in conformable, flexible, low basis weights. In crosslaid tissue fiber laminates according to U.S. Pat. No. 3,484,330, one of the desirable characteristics is the uniformity of the fabric throughout, because the reinforcing webs of highly drafted fibers may be made so as to be highly uniform in fiber density even at very low web weights. Since the fiber orientation and condition is highly uniform, the crosslaid array of such webs within the tissue fiber laminate is highly uniform throughout, which is very important from a practical standpoint, since such nonwoven fabrics are used as textile substitutes and must behave satisfactorily when stretched, folded or otherwise manipulated in the course of being fashioned into products by a manufacturer or in the course of being used by the ultimate user. Crosslaid tissue fiber laminate fabrics have uniform, predictable properties since the fiber elements of the highly drafted web components of those laminates and the tissue components, together form a precise engineered structure.

One of the principal objects of the present invention is to provide a tissue fiber laminate fabric which may be manufactured in a single pass on relatively simple machinery without crosslaying.

Another object is to provide a tissue fiber laminate fabric in which both surfaces of the finished fabric are seamless and which is conformable, flexible and soft on both surfaces making it suitable as a textile substitute where disposability is desired, at low basis weights.

A more specific object is to provide an improved tissue fiber laminate fabric suitable as a textile substitute in a large variety of single use product applications where nonwoven fabrics have commonly been used, in the form of single plies of creped cellulosic tissue, which have been stretched and ironed to facial tissue softness, and an intermediate isotropic reinforcing web of textile length fibers which is uniform with the plies of creped tissue bonded together by a pattern of adhesive which bonds each fiber in the reinforcing web at multiple, narrowly spaced, bonding points such that although many fibers in the reinforcing web may describe a highly irregular path and are not straight, a large proportion of the fiber segments between adjacent bonding points approach straight segments, which act together when a stress is applied, so as to enhance the strength and stretch characteristics of the finished fabric particularly in the cross direction, and approach the theoretical maximum strength characteristic which would be obtained with straight fiber segments extending between adjoining adhesive bonding points and the strength of the fiber matrix tending to approach the sum of the fiber segments.

Other objects and advantages will become apparent from the following description taken in connection with the accompanying drawings, in which:

FIG. 1 is a schematic view of a preferred mode of making a tissue fiber laminate according to this invention;

FIG. 2 is a fragmentary plan view of a tissue fiber laminate according to this invention with sections of individual layers broken away to show the construction;

Figure 4:
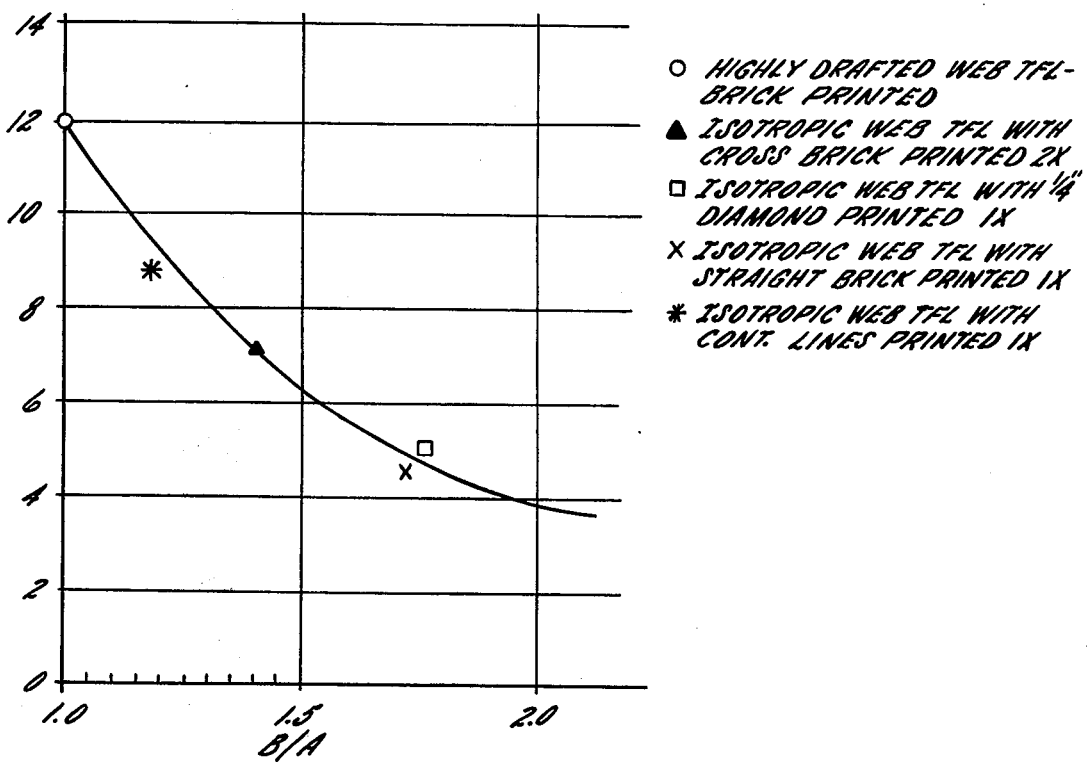
Figure 3:
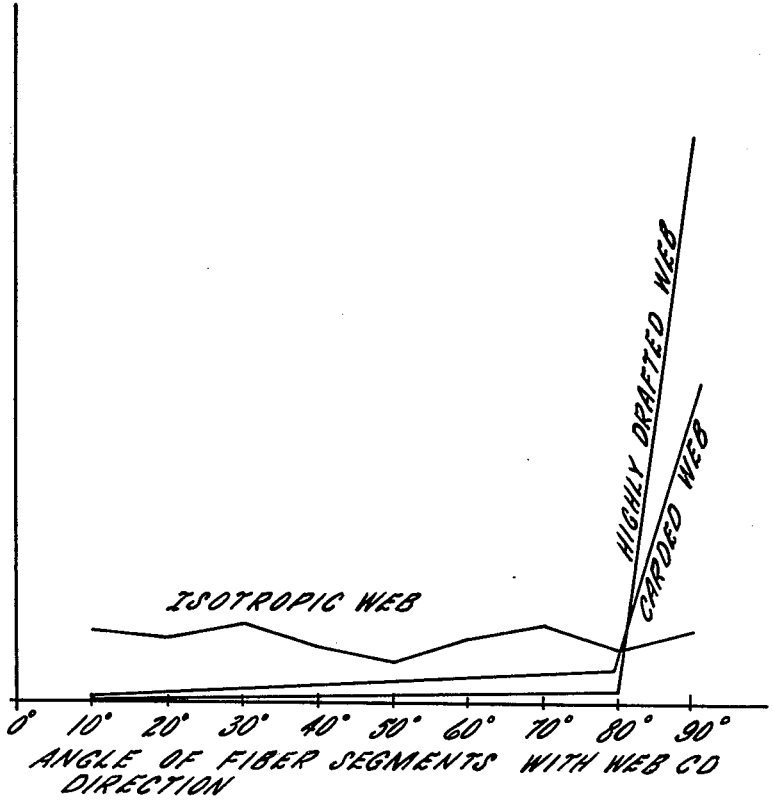

FIG. 3 is a graph illustrating characteristic curves of fiber orientation in isotropic, carded, and highly drafted textile length fiber webs; and FIG. 4 is a plot of grab tensile strengths as a function of B/A for tissue fiber laminates (TFL) with different adhesive print patterns. Grab tensile values can be obtained with a conventional Instron tensile testing machine, measurement being made on 4×6 inch samples with 1 inch jaws at a span of 3 inches and operated at 12 inches/minute.

Referring to FIGS. 1 and 2, in a preferred process for making the tissue fiber laminate fabric of this invention, adhesive is applied in a pattern 10 by a print roll 11 to the surface of one creped tissue web X received from a supply roll along a path parallel to its machine direction, the fiber web Y preferably received directly from the fiber web production machine 12 is laid on the adhesive bearing side of the tissue web X before the adhesive has set, and a second tissue web Z is then applied as received from another supply roll of creped tissue with the machine direction of the second tissue web being aligned with the machine direction of the first tissue web X. The laminate 14 is then passed into the nip between heated calendar rolls 16, 18. It is desired that the lines of adhesive in the pattern 10 applied to the first tissue web X not soak into the tissue so that after the fiber web Y and the second tissue web Z are applied, the calendering operation will be effective to force the adhesive through the fiber web Y into the other tissue web Z and attach the tissue plies or layers X, Z while bonding the fibers in the adhesive lines. Thus the adhesive serves both for ply attachment and to bond the fibers of the reinforcing web at bonding points determined by the adhesive pattern.

According to this invention, a particular fiber web and adhesive pattern cooperate to provide in the finished laminate material adequate strength properties particularly in the cross direction and good delamination resistance with minimum adhesive and minimum fiber such that the laminate is flexible and conformable and thus suitable as a textile substitute.

Considering first the fiber web, it is preferably a light weight, substantially isotropic web of textile fibers. The fibers should have a denier of 0.5 to 5, and preferably about 3, and may be of textile length in the range of ½ to 3 inches or longer, and with the majority greater than 1 inch in length. Natural or synthetic textile fibers may be used, but synthetic fibers such as polyester or rayon are preferred.

Various types of fibrous web preparing machines may be used but lightweight webs in the range of 4–20 g./yds.$^2$ as produced by Proctor & Schwarz Inc. "Isomizer" machines have been found particularly satisfactory since such machines provide webs uniform in density throughout, with excellent fiber opening and having isotropic characteristics as formed. Illustrative of such webs is the data in the following table which represents angular orientation of a statistical sample number of fibers in such a web. Using a photograph of such a web, measurements were made of the angular orientation of segments on fibers. This was done by measuring the angle of a line tangent to a segment of each fiber and this same measurement was made on randomly picked segments of fibers. The table shows some variation in fiber angular orientation, but when a plot of the data is compared with characteristic curves of fiber orientation of carded webs in which typically 50–70 percent of the fibers are aligned in the machine direction, or of highly drafted webs in which 80–95 percent of the fibers are aligned in the machine direction, as illustrated in FIG. 3, the characteristic curve of the isotropic web is markedly distinguished. For present purposes it appears that a web having the same number of fibers, as measured by a tangent to segments on the fibers, oriented at all angles would be theoretically optimum but as a practical matter if the number of fibers having any given angle of orientation is plus or minus 50 percent of the average, that is satisfactory for the purposes of this invention.

TABLE 1

Orientation of "20–0 Length" Fiber Segments In an Isotropic Web

| Angle of Fiber Segments with Cross Direction | Number of Fiber Segments | Frequency |
| --- | --- | --- |
| 0°–10° | 48 | 0.124 |
| 11°–20° | 42 | 0.116 |
| 21°–30° | 51 | 0.131 |
| 31°–40° | 39 | 0.100 |
| 41°–50° | 27 | 0.070 |
| 51°–60° | 44 | 0.116 |
| 61°–70° | 51 | 0.131 |
| 71°–80° | 38 | 0.098 |
| 81°–90° | 49 | 0.126 |
| Total (0°–90°) | 389 | 1.002 |

It will be recognized from the foregoing that the fibers in such isotropic webs are not fully extended and straight as in highly drafted webs, but on the contrary are curled and crooked in the web as formed. Notwithstanding that the individual fibers trace such a crooked random path, overall the web properties are isotropic within the limit set forth, and it is also very important that the machine preparing the web provide excellent opening of the fiber, that is, the fibers are well separated and not clumped and bunched, and the population of the fibers in the web be uniform. The characteristics, therefore, of the reinforcing web are random orientation, good separation and uniform fiber population or density.

Now turning to the adhesive pattern, according to the invention, in order to utilize such an isotropic web and provide adequate strength properties in the finished fabric, the adhesive pattern must be such as to bond each fiber at multiple, narrowly spaced, bonding points, such that a large proportion of the fiber segments between adjacent bonding points approach straight segments, which act together when a stress is applied and the strength of the fiber matrix tends to approach the sum of the fiber segments. To achieve this objective, the preferred adhesive pattern 10 is in the form of essentially continuous, narrow, spaced lines of adhesive extending transverse to the machine direction of the tissue plies X, Y.

The coaction of such an adhesive pattern and the fibrous web in producing a bonded fiber matrix, is definable by the dimensionless ratio B/A, where
1. B equals the distance between bond points along the path of the "crooked fiber segment,"
2. A equals the straight line distance between bond points.

The required measurements of A and B may be made directly on photographs of samples of a web using a grid printed on a transparent overlay representing the dimensions of the print pattern. To illustrate, with a three denier polyester isotropic web as represented by the data in Table I, a number of measurements of A and B representing a statistical sample were taken and are reported in Table II for three orientations of the grid (0°, 45° and 90° relative to the machine direction of the web) to give both the factor B/A for the web and a particular preferred print pattern in the form of uninterrupted lines 0.020 inches wide and spaced 0.060 inches apart, and an indication of the degree of directionality of fiber orientation in the web. By averaging the B/A factor so measured, any minor fiber orientation directionality in the web may be accounted for. The simplified explanation of the significance of the ratio B/A is that as the average value of B/A approaches 1.0, the fiber segments between bond points approach straight segments which act together when a stress is applied. Hence, the strength of a fiber matrix tends to approach the sum of the fiber segments as B/A approaches 1.0. With straight, fully extended fibers as in a highly drafted web, for example, and a typical pattern of interrupted lines simulating a brick pattern, the value of B/A theoretically is 1.0. From Table II it will be seen that for the preferred uninterrupted line print pattern in the preferred isotropic web, the average value of B/A is about 1.16.

TABLE II

| Orientation of Print Pattern | B/A (90% Confidence Limits; Dimensionless) | B (90% Confidence Limits Segment Length) Inches |
| --- | --- | --- |
| 0° | 1.11±0.02 | 0.054±0.005 |
| 45° | 1.15±0.04 | 0.066±0.010 |
| 90° | 1.22±0.06 | 0.071±0.028 |

Now turning to FIG. 4, this is a plot of grab tensile strengths (average of both machine and cross directions) as a function of B/A as measured for various hand made laboratory samples of tissue fiber laminates with different print patterns, and two production line samples, one a cross laid material (identified as O) and the other (identified as *) a product constructed according to this invention. A characteristic curve is drawn on FIG. 4 based on the values plotted to show how tensile strength varies as a function of B/A. All laminates except those identified with * and O were made with isotropic webs of DuPont type 54 polyester, approximately 8.1 g/yd.$^2$, a sample of which was analyzed and the data given in Table I, and creped tissue outer plies of about 15 g/yd.$^2$. The print patterns are described on the table. The values for the laminate identified as O are based on measurements made on production line samples of crosslaid tissue fiber laminates with highly drafted webs of 3 denier polyester textile length fiber, and the strength and stretch properties in the cross direction of the tissue webs. Best results have been obtained with patterns (1) of essentially continuous lines printed with good, clear definition, to increase the frequency of the bond points (2) where the B/A factor is between 1.5 and 1.0, the lower the better, to increase the strength of the fiber matrix and (3) where line width and spacing is narrow so as to achieve adequate strength and stretch properties without overly detracting from flexibility and conformability of the finished fabric.

As indicated, preferably the adhesive lines of the pattern are essentially continuous in the sense of being uninterrupted so as to minimize the missing of fibers and to increase the frequency of bonding points, although the lines may have interruptions which do not detract from the essentially continuous character of the lines. For example, in conventional brick patterns employed in commercially manufactured crosslaid tissue fiber laminates where the adhesive lines are regularly interrupted, and the interruptions are staggered from line to line to form a "brick" effect, typical patterns involve about 20 percent of the total line length comprising the spaces between the line segments. In cross brick patterns where the spaces are partially filled in by cross brick lines, about 8 percent of the total line length may comprise space between the adhesive line segments. When B/A was measured for the preferred fiber web and a conventional brick pattern where the line width approximated 0.030 inch and the spacing 0.090 inch (identified as X in FIG. 4), B/A averaged 1.72 and the average strength value was under 5 lbs./in. Another pattern of lines of small squares where the line spacing and width was less than about 1/16 inch (0.060 inch) even with almost 50 percent of the total line length comprising the spaces between the square line segments, when applied to the preferred fiber web resulted in a measured B/A factor of about 1.24 and a predicted average strength of the finished laminate of over 8 lbs./in. Thus in theory at least, lines with spaces up to 50 percent of their length may provide low factors of B/A with a given web if the lines are narrow and the spacing is narrow. In practice, however, where adhesive is applied to the tissue webs by transfer systems using etched rolls, it has been found that patterns of continuous lines are preferred over patterns of discontinuous lines made up of short segments. This is because of the problem in transferring the adhesive from the cells of an etched roll and obtaining good clear definition of the pattern being printed where the patern is formed by interrupted lines. With other types of adhesive applying systems where that problem does not arise, it could be feasible to use patterns made up of such discontinuous or interrupted lines such as brick and cross brick patterns, provided that the particular pattern coacts with the isotropic web to provide a low factor of B/A. In other words, practical process considerations may make one adhesive pattern preferable over another even though both are theoretically acceptable from a fiber matrix strength standpoint.

Other additional practical considerations are also involved in securing optimum results from the coaction of a print pattern and fiber web. Two important considerations are that the patterns be nondirectional and that they have no defined planes of weakness angling across the material along which failure under stress may propagate.

Thus, for the purposes of this invention, patterns with continuous lines are preferred over patterns with interrupted lines, but interrupted lines with about 50 percent space or less in the total line length are "essentially continuous" lines. The adhesive pattern may be a reticulated pattern where spaced continuous lines extending transverse to the machine direction of the tissue webs (by which is meant intersecting the machine direction, which is the direction parallel with the direction of movement on the paper machine on which the tissue web was formed) are intersected by crossing lines and form regularly repeating closed squares, diamonds or other geometric figures. Cross brick patterns formed by sets of intersecting, interrupted lines form a reticulated pattern and are illustrative of an alternative pattern suitable for the practice of the invention where such pattern meets the other parameters of width and spacing, total area covered, practical process considerations in adhesive application, and in combination with the preferred isotropic web results in a B/A factor within the preferred range. Successive printing of the same pattern with the second printing out of register with the first to increase the number of bonding points is another example of a reticulated pattern, although such patterns may form geometric figures that are not regularly repeating, that may produce a low B/A factor and serve satisfactorily if meeting the other conditions. Such a pattern is identified as Δ in FIG. 4.

With regard to line width and spacing, it is preferred that the line width as applied be greater than 0.010 inches and less than the spacing between lines, and the spacing between lines preferably be not greater than about 0.060 inches. This means from 10 to about 50 lines of adhesive per inch and preferably from 10 to 20 lines per inch in a pattern of equally spaced continuous lines. While some lateral spreading of the adhesive lines cannot be avoided in the calendering operation, it is desired to minimize the lateral growth of the lines. If the adhesive pattern is too fine, there may be a problem with securing adequate bonding of the fibers, and if the amount of adhesive is too small, there may be a problem both with securing adequate bonding of the fibers and obtaining adequate ply attachment. Furthermore, between about 25 and 50 percent of the total area and preferably 30 – 40 percent should be covered by adhesive, in order to achieve a flexible and comfortable finished fabric. The weight of adhesive in the finished laminate may range from 3 to 20 g/yd.$^2$.

Adhesives which can be applied as aqueous dispersions or solutions are generally suitable. Examples of such materials include water soluble polymeric materials, and water dispersible resins such as various vinyl resins (e.g. polyvinyl acetate and vinyl acetate/ethylene copolymers) and acrylics. Adhesive materials such as vinyl resins dispersed in suitable organic solvents can also be employed. In addition, plastisols, i.e., polymeric materials such as vinyl polymers (e.g. vinyl chloride) and copolymers dispersed in fluid plasticizers such as dioctyl phthalate and the like, can also be used at suitable viscosities. With respect to such plastisols, removal of the liquid plasticizer is accomplished by absorbing the plasticizer into the polymer particles which occurs on curing of the plastisol.

Penetration of adhesive must be carefully controlled so that the adhesive lines remain on the tissue surface and the fibers of the reinforcing web become embedded therein. Various factors must be balanced to limit penetration such as the amount and viscosity of the adhesive added, and how it is applied. In addition to the basic formulation of adhesive, the factors that must be controlled are the wettability of the web (the adhesive will penetrate into a web that wets readily), the viscosity of the adhesive (by using a higher viscosity adhesive penetration may be limited), and such other factors as the wetting tendency of the adhesive.

Fast curing plastisol adhesives of the types mentioned in U.S. Pat. No. 3,484,330 are preferred, characterized by relatively low viscosity, low migration tendencies, and minimum volatility. Such adhesives remain soft and flexible after curing, can be reactivated by the application of heat and pressure, and insure that the resultant laminated product retains the desired softness, and proper hand and feel.

The creped cellulose tissue preferably has a finished basis weight of 7–30 g/yd.$^2$ preferably 10–20 g/yd.$^2$. To achieve the requisite uniform caliper, it is stretched and ironed after creping off the dryer of the paper machine. Preferably the tissue contains wet strength resins, although such treatment is not essential. While creped tissue is conventionally manufactured on paper machines carrying out water laying processes, the tissue layers of the laminate of this invention may be made by other processes such as by air laying processes for forming cellulosic tissue from paper making wood fibers as, for example, disclosed in U.S. Pat. No. 3,692,622.

Table III below contains values for grab tensile strength and % stretch for the preferred laminate product according to this invention, identified as *, and for two single plies of creped tissue, identified as A, bonded by the preferred adhesive pattern of narrowly spaced, continuous transverse lines without any fiber web intermediate the tissue plies.

TABLE III

|        | Grab Tensile lbs./in. |     | Grab Stretch % to Break |     |
|--------|-----------------------|-----|-------------------------|-----|
| Sample | MD                    | CD  | MD                      | CD  |
| *      | 9.8                   | 7.0 | 19                      | 43  |
| A      | 6.3                   | 2.4 | 14                      | 9   |

The fiber web was measured as being 8.6 g/yd.$^2$, was 3 denier polyester (ENKA), while the creped tissue was measured as being 12.6 g/yd.$^2$ finished basis weight. The adhesive weight was 14.2 g/yd.$^2$. The values given are averages of 10 different measurements.

It may be observed that the creped tissue disrupts before the laminate product breaks, and thus the creped tissue alone is not a significant contributor to the ultimate strength of the laminate product. The material of this invention has more stretch in both directions, particularly in the cross direction, than fiber reinforced tissue products of comparable weights heretofore available commercially, and have improved aesthetic properties of softness and drapability. The material of this invention is thus particularly suited for use in relatively heavy duty applications such as in surgical drapes where the creped tissue plies may have a weight at the heavy end of the range and be treated for water repellency, as well as for moderate duty applications such as in industrial and hospital garments, disposable sheets, pillow cases, covers and drapes, and like products.

We claim as our invention:

1. A tissue fiber laminate comprising outer plies of cellulosic tissue with the machine direction of said tissue plies the same, an intermittent substantially isotropic web of randomly oriented fibers, and lines of adhesive in a pattern between said outer plies of tissue attaching the tissue plies to each other with the fibers of the fiber web bonded in the adhesive lines, said outer tissue plies each having a finished basis weight between about 7 and about 30 g/yd.$^2$, said adhesive pattern comprising spaced lines extending transverse to the machine direction of said tissue plies, with the line width being more than about 0.010 inch and less than the spacing between lines, the spacing between lines being not greater than about 0.060 inch, and covering between about 25 and about 50 percent of the total area of the pattern, and the weight of the adhesive in the laminate being in the range of about 3 to about 20 g/yd.$^2$, said substantially isotropic web comprising textile fibers in the range of about ½ inch to about 3 inches in length, and of ½ to 5 denier, and said web having a weight between about 4 and about 20 g/yd.$^2$, the fibers being curled and crooked in the web as formed and having a degree of random orientation in the web such that the number of fibers having any given angle of orientation as measured by a tangent to segments on a statistical sample number of fibers is within plus or minus 50% of the average, and the fibers of said web being free of attachment to each other and to the tissue plies except where attached by the adhesive in the pattern to provide a bonded fiber matrix wherein the B/A factor for said adhesive pattern and said web is less than about 1.5, where A equals the straight line distance between bond points, and B equals the distance between bond points along the path of the crooked fiber segment.

2. A tissue fiber laminate according to claim 1 wherein said adhesive pattern comprises uninterrupted, straight, equally spaced lines extending substantially at right angles to the machine direction of said tissue plies.

3. A tissue fiber laminate according to claim 1 wherein said adhesive pattern comprises two sets of essentially continuous, intersecting, spaced lines extending transverse to the machine direction of said tissue plies and forming a reticulated pattern.

4. A tissue fiber laminate according to claim 3 wherein said reticulated pattern is formed of regularly repeating, geometrically similar figures.

5. A process according to claim 1 wherein said adhesive is a polymeric adhesive applied in liquid form to said first tissue web, and said fiber web is layed on said first tissue web and said second tissue web is juxtaposed thereon before said adhesive is set.

6. A tissue fiber laminate comprising outer plies of cellulosic tissue with the machine direction of said tissue plies the same, an intermediate substantially isotropic web of randomly oriented fibers, and lines of adhesive in a pattern between said outer plies of tissue attaching the tissue plies to each other with the fibers of the fiber web bonded in the adhesive lines, said outer tissue plies each having a finished basis weight of between about 10 and 20 g/yd.$^2$, said adhesive pattern comprising essentially continuous spaced lines extending transverse to the machine direction of said tissue plies, with the line width being more than about 0.010 inch and less than the spacing between lines, the spacing between lines being greater than about 0.060 inch, and covering between about 30–40 percent of the total area of the pattern, and the weight of the adhesive in the laminate being in the range of about 3 to about 20 g/yd.$^2$, said substantially isotropic web comprising textile fibers in the range of about ½ inch to about 3 inches in length and of ½ to 5 denier, and said web having a weight between about 5 and 10 g/yd.$^2$, the fibers being curled and crooked in the web as formed, and the fibers of said web being free of attachment to each other and to the tissue plies except where attached by the adhesive in the pattern to provide a fiber matrix which has a B/A factor less than about 1.5, said laminate having a grab tensile strength average of machine and cross direction of above about 6 lbs./in.

7. A process for the manufacture of tissue fiber laminates, comprising carrying a first cellulosic tissue web along a path parallel to its machine direction past an adhesive printing station, at said station printing on one surface of said first tissue web a pattern of adhesive in the form of essentially continuous, spaced lines extending transverse to the machine direction of said tissue web, and in an amount in the range of about 3 to about 20 g/yd.$^2$, said lines having a width greater than 0.010 inch and less than the spacing between lines, and the spacing between lines being not greater than about 0.060 inch, and controlling the penetration and lateral growth of the adhesive lines so that the adhesive lines remain clearly defined on the tissue web surface and cover between about 25 to 50 percent of the total area, laying a substantially isotropic textile fiber web of fibers of a length between about ½ inch to about 3 inches on the adhesive bearing surface of said first cellulosic tissue web such that the fibers of said fiber web become embedded in the adhesive lines, superposing a second tissue web and the first tissue web with the fiber web intermediate thereof and with the machine direction of said second tissue web aligned with the machine direction of said first tissue web, and hot calendering the first and second tissue webs and intermediate fiber web by passing said webs between calendar rolls heated to a temperature of 150°–450°F. and subjecting said webs to a nip pressure of 25–600 pli to force the adhesive on the first tissue web through the fiber web to the second tissue web to attach said tissue webs to each other while bonding the fibers of said fiber web in the pattern of said adhesive.

8. A method for the manufacture of tissue fiber laminates comprising introducing a substantially isotropic web of randomly distributed and well separated textile fibers of a length in the range between about ½ inch and about 3 inches, and of ½ to 5 denier between outer plies of cellulosic tissue wherein the machine direction of said tissue plies is the same, and attaching said tissue plies to each other while reinforcing said laminate to enhance the stretch to break and tensile strength in both the machine and cross directions of the laminate by bonding said isotropic web into a fiber matrix with a clearly defined pattern of essentially continuous spaced adhesive lines extending transverse to the machine direction of said tissue plies, with line width being more than about 0.010 inch and less than the spacing between lines, the spacing between lines being not greater than about 0.060 inch, and covering between about 25 and about 50 percent of the total area of pattern, and the weight of adhesive being in the range of about 3 to about 20 g/yd.$^2$, wherein the B/A factor for said adhesive pattern and said web is less than about 1.5, where A equals the straight line distance between bond points, and B equals the distance between bond points along the path of the crooked fiber segment, and such that the fiber segments contribute to the strength of the fiber matrix and provide a laminate having a grab tensile strength (average of machine and cross direction of above about 6 lbs./in.

* * * * *

UNITED STATES PATENT OFFICE
CERTIFICATE OF CORRECTION

Patent No. 3,958,055      Dated May 18, 1976

Inventor(s) Thomas A. Hadley et al.

It is certified that error appears in the above-identified patent and that said Letters Patent are hereby corrected as shown below:

Column 9, claim 6, line 43, before "greater" insert -- not --.

Signed and Sealed this

Fifteenth Day of March 1977

[SEAL]

Attest:

RUTH C. MASON
*Attesting Officer*

C. MARSHALL DANN
*Commissioner of Patents and Trademarks*